(12) United States Patent
Weiss

(10) Patent No.: US 8,874,369 B2
(45) Date of Patent: Oct. 28, 2014

(54) SYSTEM AND METHOD FOR REDUCING ROUTE PREVIEWS TO REDUCE DRIVER WORKLOAD

(75) Inventor: John P. Weiss, Shelby Township, MI (US)

(73) Assignee: General Motors LLC, Detroit, MI (US)

( * ) Notice: Subject to any disclaimer, the term of this patent is extended or adjusted under 35 U.S.C. 154(b) by 1822 days.

(21) Appl. No.: 11/516,984

(22) Filed: Sep. 7, 2006

(65) Prior Publication Data

US 2008/0065314 A1 Mar. 13, 2008

(51) Int. Cl.
*G01C 21/34* (2006.01)
*G01C 21/36* (2006.01)

(52) U.S. Cl.
CPC ..................... *G01C 21/36* (2013.01)
USPC ........................... 701/430; 701/410

(58) Field of Classification Search
CPC ........................................ G01C 21/36
USPC .................. 701/200, 410, 430, 431, 440, 532
See application file for complete search history.

(56) References Cited

U.S. PATENT DOCUMENTS

| | | | | |
|---|---|---|---|---|
| 5,528,501 A | * | 6/1996 | Hanson | 701/533 |
| 6,122,593 A | * | 9/2000 | Friederich et al. | 701/532 |
| 6,526,348 B1 | * | 2/2003 | McDonough | 701/420 |
| 6,678,611 B2 | * | 1/2004 | Khavakh et al. | 701/418 |
| 6,771,189 B2 | * | 8/2004 | Yokota | 340/990 |
| 7,054,745 B1 | * | 5/2006 | Couckuyt et al. | 701/431 |
| 7,065,448 B1 | * | 6/2006 | Gearhart | 701/431 |
| 7,395,153 B1 | * | 7/2008 | Nesbitt et al. | 701/533 |
| 7,561,965 B1 | * | 7/2009 | Nesbitt et al. | 701/425 |
| 7,640,100 B2 | * | 12/2009 | Spinelli | 701/425 |
| 2002/0103599 A1 | * | 8/2002 | Sugiyama et al. | 701/211 |
| 2005/0192033 A1 | | 9/2005 | Videtich | |
| 2006/0100776 A1 | | 5/2006 | Weiss et al. | |
| 2006/0136122 A1 | | 6/2006 | Fraser et al. | |
| 2006/0190164 A1 | | 8/2006 | Glaza | |

\* cited by examiner

*Primary Examiner* — Stephen Holwerda
(74) *Attorney, Agent, or Firm* — Leydig, Voit & Mayer, Ltd.

(57) ABSTRACT

A method and computer-readable medium for generating and presenting a preview of a driving route reduces driver workload. In an example, the method determines that the driving route comprises more than the predetermined number of driving instructions and creates a route preview wherein the number of instructions does not exceed the predetermined number of driving instructions. In a further example, the route preview is created by eliminating certain instructions from the route. A predetermined number of instructions at the beginning of the route may be exempted from possible elimination. In a further example, the elimination of instructions is implemented by sequentially eliminating classes of instructions until the remaining number of instructions in the route is less than or equal to the predetermined maximum acceptable number.

16 Claims, 7 Drawing Sheets

- Go West on Central Street for .4 miles
- Turn Right onto Main Street and go 2 miles
- Main Street becomes Lincoln Ave
- Turn Right onto I-75 and go 5 miles
- Bear Right to stay on I-75
- Exit Right and go .1 mile
- Turn left onto MLK Blvd and go 2.5 miles
- Turn Right on Pine road and .1 miles
- Arrive at 123 Pine road

SYSTEM AND METHOD FOR REDUCING ROUTE PREVIEWS TO REDUCE DRIVER WORKLOAD

BACKGROUND OF THE INVENTION

Informational devices such as telematics units are now sold with or added to many cars and other vehicles and can provide wireless communication and location-based services. These services may be accessed through interfaces such as voice-recognition computer applications, touch-screen computer displays, computer keyboards, or a series of buttons on the dashboard or console of a vehicle.

Currently, telematics units are often able to provide various types of mapping services, including driving directions, street routing, and so on. Although a vehicle telematics unit may perform many functions other than navigation, the navigational capabilities are of primary importance to many drivers. With respect to navigation, driving directions may be accessed through services that offer maps and driving directions. To use these types of services, the user may specify desired starting and/or ending addresses. Sources of routing services include off-board navigation servers, onboard data sources (e.g., databases, CDs, DVDs, etc.) and other suitable sources.

In many cases, regardless of the mechanism by which routing data is obtained, the directions may be presented in the vehicle in a visual, textual, or audio format that presents at least a portion of the route. For example, a map portion related to the user's current position may be displayed in preference to other portions of the route. Upcoming required maneuvers, such as turns or branches, may be graphically illustrated, such as by an arrow. In another example, required actions may be presented to the user verbally, where the turns are annunciated to the user as the user approaches a maneuver. In this manner, the user may follow the visual or audio directions and eventually arrive at the desired destination if all directions are followed correctly.

However, drivers may not prefer understanding only a small portion of the route at a time, since the user may want to compare the entire route to other known routes, schedule a rendezvous at an undisplayed point along the route, etc. Moreover, prior to embarking on a given route, users typically desire to preview the route to ensure that the route is direct and accurate. This is especially true of very long routes, such as cross-country routes. Current vehicle navigation units may provide route preview information for this purpose. For example, a vehicle navigation unit may provide a textual preview of the entire route or a visual preview of the entire route (e.g., via a highlighted map). However, such representations often contain a greater amount of detail than is necessary to satisfy a user's needs, and may be inefficient at concisely conveying the desired information to the driver.

A route preview system for a vehicle navigation unit is needed whereby a sufficiently informative preview of the route is given to increase driver understanding and satisfaction without increasing the driver workload.

BRIEF SUMMARY OF THE INVENTION

The invention provides a method for generating and presenting a preview of a driving route when the number of instructions in the route would otherwise exceed a predetermined number of acceptable instructions. A method according to an example of the invention comprises determining that the driving route comprises more than the predetermined number of driving instructions, creating a route preview wherein the number of instructions does not exceed the predetermined number of driving instructions, and presenting the route preview to the user. The route preview is created by eliminating certain instructions from the route, although in an example of the invention a predetermined number of instructions at the beginning of the route are exempted from possible elimination.

In a further example of the invention, the elimination of instructions is implemented by sequentially eliminating classes of instructions until the remaining number of instructions in the route is less than or equal to the predetermined maximum acceptable number. In an example of the invention, the final class of eliminated instructions encompasses all instructions beyond the exempted instructions at the beginning of the route. In a further example of the invention, when all instructions beyond the exempted instructions at the beginning of the route are eliminated, a summary statement or representation is placed into the route preview in lieu of the eliminated instructions.

Other objects and advantages of the invention will become apparent upon reading the following detailed description and upon reference to the drawings.

BRIEF DESCRIPTION OF THE SEVERAL VIEWS OF THE DRAWINGS

FIG. 4A is a route listing showing a route comprised of a plurality of maneuvers;

DETAILED DESCRIPTION OF THE INVENTION

Before describing the invention in detail, an exemplary environment in which the invention may operate will be described. It will be appreciated that the described environment is for purposes of illustration only, and does not imply any limitation regarding the use of other environments to practice the invention.

Figure 1:
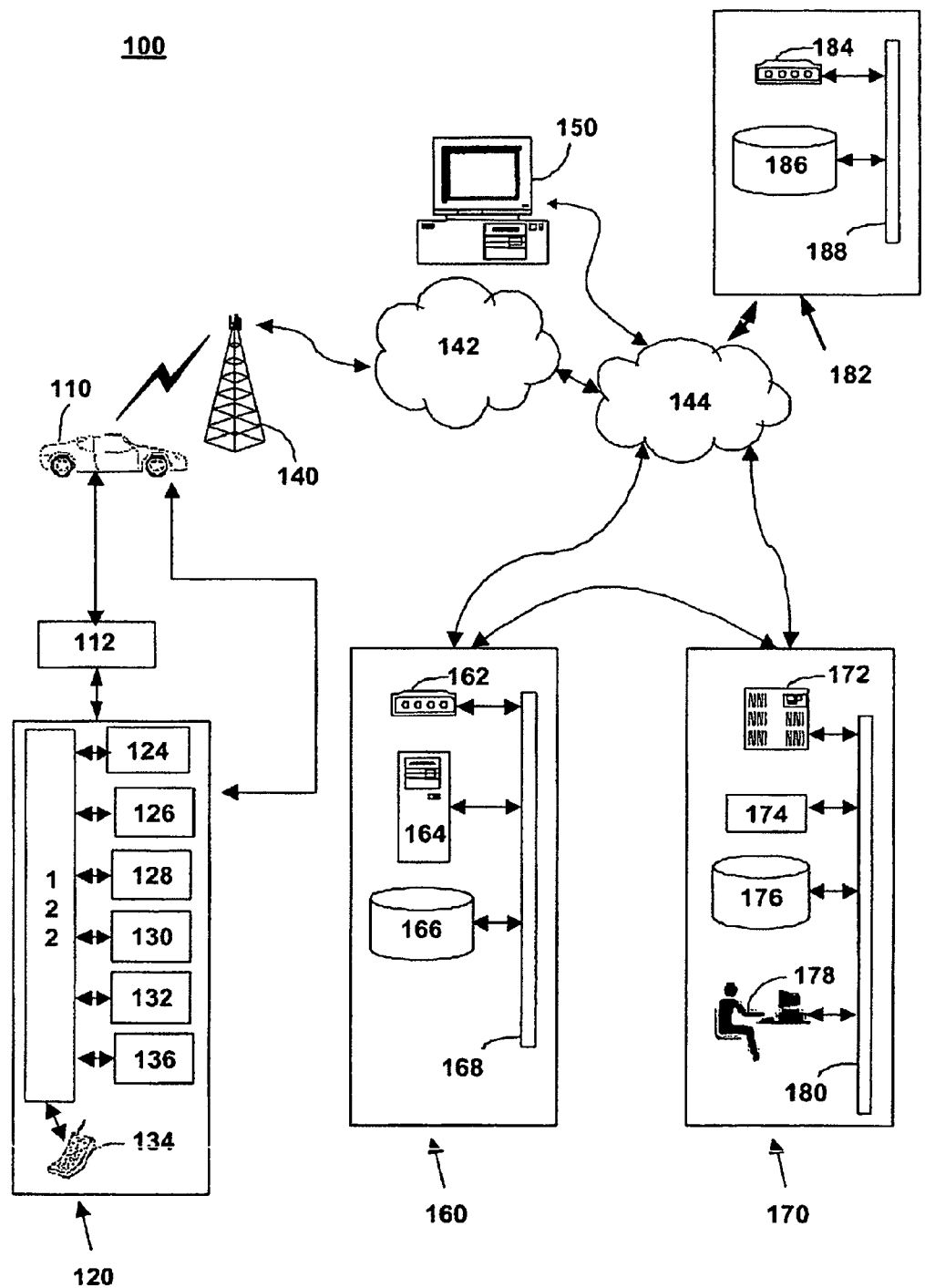
FIG. 1 is a schematic diagram of an operating environment for a mobile vehicle communication system.

FIG. 1 is a schematic diagram of an operating environment for a mobile vehicle communication system 100 usable in accordance with the present invention. Although the system 100 includes many mechanisms for delivering navigational data to a telematics unit, it will be appreciated that the invention does not require that navigation data be delivered to the telematics unit, since it may instead be made available from a local source such as a computer memory, a CD, a DVD or other digital storage medium. However, in an example of the invention, the routing or navigation information is delivered via wireless communications.

The mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more client, personal or user computers 150, one or more web-hosting portals 160, and one or more call centers 170. In one example, the MVCU 110 is implemented as a mobile vehicle equipped with suitable hardware and software for transmitting and receiving data, and in some cases voice, communications. The MVCS 100 may include other components instead of or in addition to those shown. Mobile vehicle communication systems and telematics units are known in the art. In operation, the MVCU 110 may be implemented via a motor vehicle, a marine vehicle, or as an aircraft. Moreover, the MVCU 110 may include additional components not relevant to the present discussion.

Vehicle communication network 112 may send signals to various units of equipment and systems within MVCU 110 to perform various functions such as unlocking a door, opening the trunk, setting personal comfort settings, and calling from telematics unit 120. Vehicle communication network 112 may utilize network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

The MVCU 110 sends and receives radio transmissions from wireless carrier system 140 via telematics unit 120. The wireless carrier system 140 can be implemented as any suitable system for transmitting a signal from the MVCU 110 to the communication network 142.

The telematics unit 120 includes a processor 122 connected to a wireless modem 124, a global positioning system (GPS) unit 126, an in-vehicle memory 128, a microphone 130, one or more speakers 132, an on-board navigation unit 136, and an embedded or in-vehicle mobile phone 134. In other examples, the telematics unit 120 may be implemented without one or more of the above listed components, such as, for example an in-vehicle mobile phone 134 or speakers 132. The telematics unit 120 may include additional components as well.

Processor 122 is implemented in an example of the invention as a microcontroller, microprocessor, controller, host processor, or vehicle communications processor. In one example, processor 122 is a digital signal processor (DSP). In an example, processor 122 is implemented as an application specific integrated circuit (ASIC). In another example, processor 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 may be a cellular-type phone, such as, for example an analog, digital, dual-mode, dual-band, multi-mode or multi-band cellular phone.

Processor 122 executes various computer programs that control programming and operational modes of electronic and mechanical systems within MVCU 110. Processor 122 controls communications (e.g. call signals) between telematics unit 120, wireless carrier system 140, and call center 170. A voice-recognition application may be installed in processor 122 that can translate human voice input through microphone 130 to digital signals. Processor 122 can generate and accept digital signals transmitted between telematics unit 120 and the vehicle communication network 112 that is connected to various electronic modules in the vehicle. These digital signals may activate the programming mode and operation modes, as well as provide for data transfers. Signals from processor 122 may be translated into voice messages and transmitted via speaker 132.

Communication network 142 can include services from one or more mobile telephone switching offices and wireless networks. For example, communication network 142 typically connects wireless carrier system 140 to land network 144. It will be appreciated that the communication network 142 can be implemented as any suitable system or collection of systems for connecting wireless carrier system 140 to MVCU 110 and land network 144.

Land network 144 connects communication network 142 to client computer 150, web-hosting portal 160, call center 170, and off-board navigation server 182. In one example, land network 144 is a public-switched telephone network (PSTN). In another example, land network 144 is implemented as an Internet protocol (IP) network. In other examples, land network 144 is implemented as a wired network, an optical network, a fiber network, other wireless networks, or any combination thereof. Land network 144 may be connected to one or more landline telephones.

Client, personal or user computer 150 includes a computer usable medium to execute Internet browser and Internet-access computer programs for sending and receiving data over land network 144 and optionally, wired or wireless communication networks 142 to web-hosting portal 160. Personal or client computer 150 may transmit user preferences to web-hosting portal 160 through a web-page interface using communication standards such as hypertext transport protocol (HTTP), and transport-control protocol and Internet protocol (TCP/IP). In one example, the data includes directives to change certain programming and operational modes of electronic and mechanical systems within MVCU 110. In operation, a client utilizes computer 150 to initiate setting or re-setting of user-preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by the one or more data modems 162. Land network 144 sends digital data to and from modem 162, which data may then be transferred to web server 164. Modem 162 may reside inside web server 164. Land network 144 transmits data communications between web-hosting portal 160 and call center 170.

Web server 164 receives user-preference data from user computer 150 via land network 144. In alternative examples, computer 150 includes a wireless modem to send data to web-hosting portal 160 through network 142 and a land network 144. Data is received by land network 144 and sent to one or more web servers 164. In one example, web server 164 is implemented as any suitable hardware and software capable of providing web services to help change and transmit personal preference settings from a client at computer 150 to telematics unit 120 in MVCU 110. Web server 164 sends to or receives from the one or more databases 166 data transmissions via network system 168. Web server 164 includes computer applications and files for managing and storing personalization settings supplied by the client, such as door lock/unlock behavior, radio station preset selections, climate controls, custom button configurations and theft alarm settings. For each client, the web server 164 potentially stores hundreds of preferences for wireless vehicle communication, networking, maintenance and diagnostic services for a mobile vehicle.

The off-board navigation server 182 includes one or more data modems 184, one or more databases 186, and a network system 188. Off-board navigation server 182 may be connected directly by wire to call center 170, or connected by phone lines to land network 144, which is connected to call center 170. In an example, off-board navigation server 182 is connected to call center 170 utilizing an IP network. In this example, both the off-board navigation server 182 and the call center 170 are connected to land network 144 utilizing the IP network. In another example, off-board navigation server 182 is connected to land network 144 by the one or more data modems 184. Land network 144 sends digital data to and from modem 184. Land network 144 transmits data communications between off-board navigation server 182 and call center 170. The databases 186 in off-board navigation server 182 contain maps correlated to GPS signals. In one example, the map data is located in databases external to the off-board navigation server 182. Communications between the elements of system 100 may be analog transmissions, digital transmissions, or packet data transmissions over a network.

Figure 2:
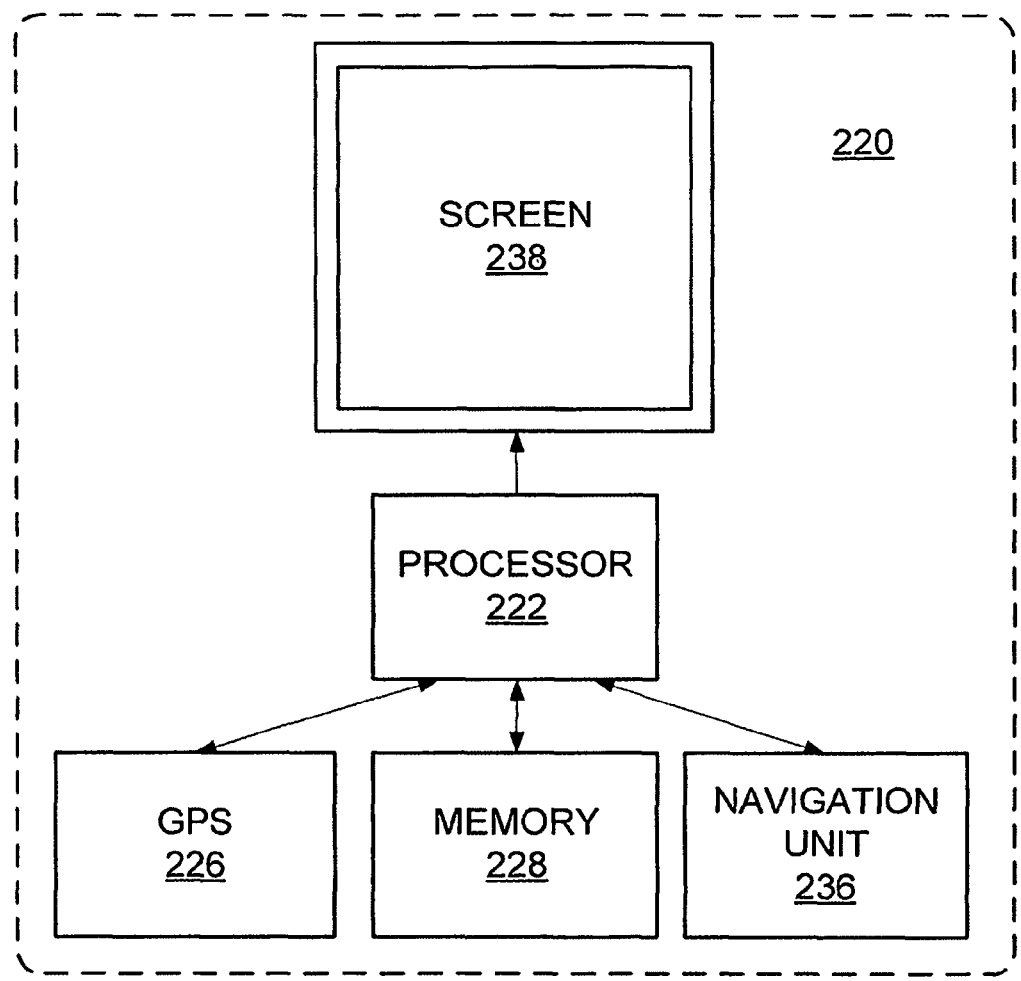
FIG. 2 is a more detailed schematic diagram of a telematics system within a mobile vehicle.

FIG. 2 illustrates certain salient aspects of the telematics unit 120 of the mobile vehicle communication system (MVCS) 100 in greater detail. The telematics unit 220 (120) comprises a processor 222 communicably linked to a global positioning system (GPS) unit 226, an in-vehicle memory 228, an on-board navigation unit 236, and a screen 238. In an example of the invention, the GPS unit 126 provides the current location of the vehicle (e.g., longitude and latitude coordinates) derived from a GPS broadcast signal. The screen 238 may be of any suitable type, but may typically be a low power display such as an LCD TFT (thin-film-transistor) display. As noted above, the processor may be of any suitable type and is able to perform calculations and data manipulations and to interact with the GPS 226, the memory 228, the navigation unit 236, and the screen 238. In general, the processor 222 executes various computer programs that control the electronic and mechanical systems within MVCU 110.

In an example of the invention, the processor 222 controls the GPS 226, the memory 228, the navigation unit 236, and the screen 238 so as to calculate and display route information to a user of the telematics unit 220. In particular, the processor 222 gathers data from the GPS unit 226 to identify the current position of the telematics unit 220. This location data is provided to the navigation unit 236 so that it may provide route information. The route information for display may be calculated by the navigation unit 236 or by the processor 222 based on data from the navigation unit 236. The memory 228 is used by the processor 222 during the execution of tasks.

In one example, the route information is presented to the user via the screen 238. In another example, the route data may be presented to the user via one or more speakers 132. The route data may be presented in a visual, textual, or audio format to guide the user, and typically, during driving, only the immediately relevant portions of the route are presented. Thus, for example, the display 238 may show a half-mile of the route ahead of the current location of the telematics unit 220 and a similar or smaller portion behind the current location of the telematics unit 220. During driving, this is often sufficient to allow the user to accurately navigate the calculated route.

However, it is sometimes desirable to present a route summary or preview to the user. In an example of the invention, the user of the telematics unit 220 may invoke a route summary presentation by activating a button, touch panel, or touch screen element adjacent to, associated with, or on screen 238. In another example, the route may be invoked verbally by uttering into microphone 130. In an example of the invention, the route preview information extends the length of the entire route but omits selected aspects of the route so as simplify the representation and aid the user's ease of understanding, as well as to minimize the time required to understand the preview.

In overview, the route preview information maximizes the information regarding maneuvers that are soon to occur while minimizing the detail regarding distant maneuvers. The route and the route preview are presented to the user as a series of maneuvers in an example of the invention; however, the route preview may also contain a generalized description or illustration of certain sets of maneuvers. In an example of the invention, the route preview information is reduced only if the route contains more than a predetermined number of maneuvers. In a further example of the invention, a predetermined sequential set of next maneuvers is exempted from reduction.

Examples of techniques used to reduce the route include removing certain compound maneuvers (maneuvers requiring multiple turns in a short distance), removing name change maneuvers, removing certain highway split maneuvers, removing certain highway interchange maneuvers, and compressing a plurality of maneuvers via a summary description or representation thereof.

Figure 3:
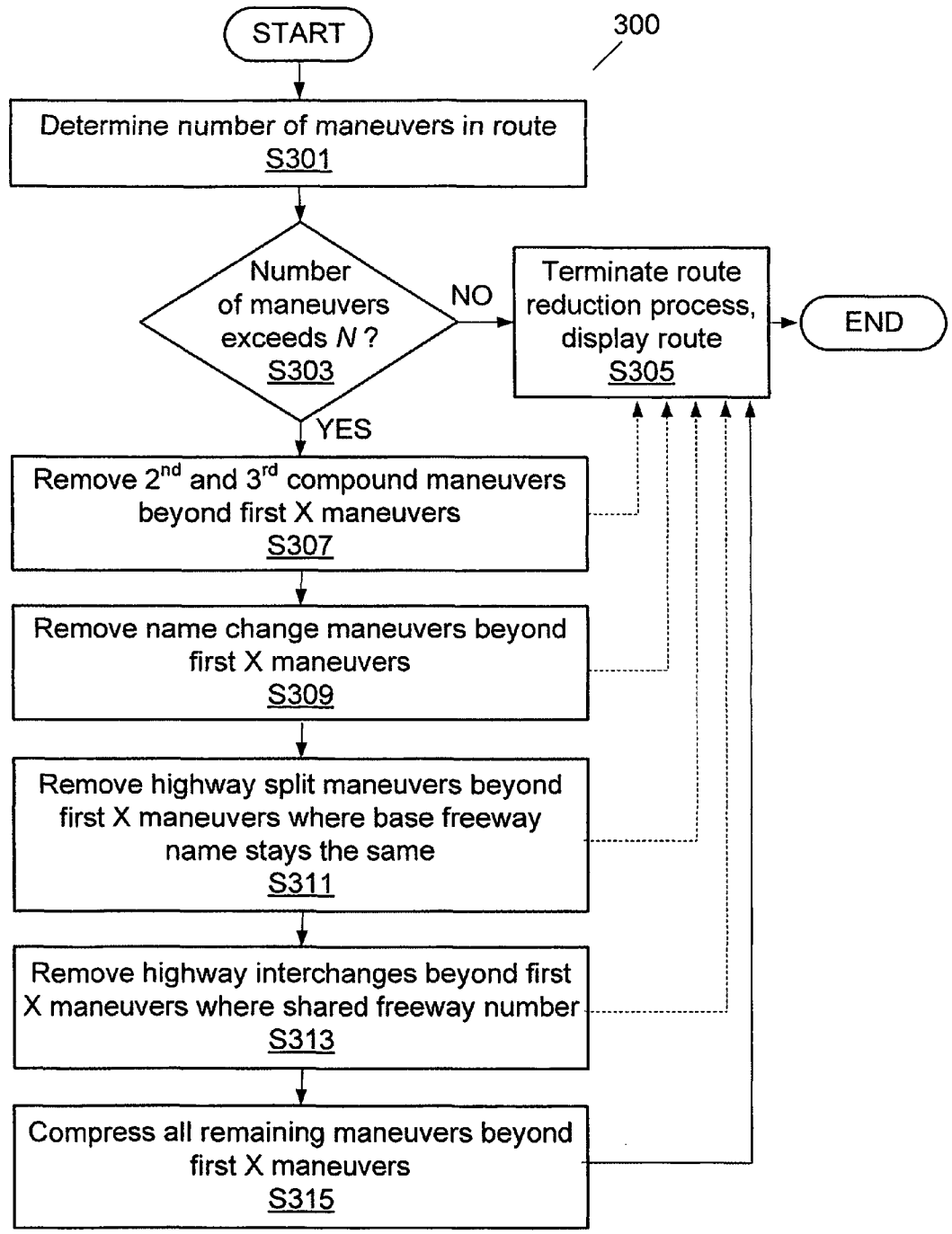
FIG. 3 is a flow chart illustrating a process of prioritized route reduction according to an example of the invention.

FIG. 3 is a flow chart showing an exemplary process for reducing a route description in keeping with the principles discussed above. The process will be discussed as executed by a navigation application, but it will be appreciated that the navigation application may be executed by the processor 222, navigation unit 236, or a combination of these components. It will be appreciated that the described process is merely an example, and that other mechanisms may be used in addition to or instead of some or all of those disclosed.

The process of route reduction begins after the user has designated a starting and ending point (or other criteria) and the system has calculated driving instructions (the route). At stage S301 of the process 300, the navigation application determines the number of maneuvers in the route. A maneuver is a unit of driving activity such as a turn, a branch, a road change, etc. For example, a maneuver might require the user to turn left onto a certain street and proceed for a certain distance. A maneuver will typically contain no more than a single turn, branch, road change, etc. A compound maneuver may contain two or more units of driving activity, such as two or more turns.

At stage S303, the navigation application determines whether the number of maneuvers in the route exceeds a predetermined number N. In an example of the invention, the predetermined number N is set based on the manufacturer's, installer's, or user's estimation of the number of instructions above which the user may become distracted. For example, N may be set to 3-5. If it is determined at stage S303 that the number of maneuvers in the route does not exceed N, then the route reduction process terminates at stage S305. Since the route meets the requirements for driver workload in this case, it may now be presented to the driver.

If instead it is determined at stage S303 that the number of maneuvers in the route exceeds N, then the route reduction process continues to stage S307. At stage S307, the navigation application removes certain compound maneuvers from the route. In an example of the invention, the first X maneuvers of the route are excluded from the route reduction process, in that the route reduction stages described hereinafter are not applied to those first maneuvers. The number X is selected based on manufacturer, installer, or user estimation of the number of detailed upcoming maneuvers that a driver can meaningfully process. For example, X may be set to 2. Although the process shown in FIG. 3 incorporates this feature, it will be appreciated that in an alternative example of the invention, all maneuvers are subject to reduction.

Continuing with stage S307, the application may remove repeated second and third compound maneuvers after the first X maneuvers for example. As denoted by the dashed line between stage S307 and S305, the navigation application recomputes the number of maneuvers remaining in the route and terminates the reduction process if the number of maneuvers has become equal to or less than N.

If the number of maneuvers still exceeds N after stage S307, the process continues to stage S309, wherein the navigation application removes any name change maneuvers beyond the first X maneuvers. For example, the maneuver "Maple Ave becomes Westlake Dr." would be removed at this stage. Again, after completing stage S309, the navigation application recomputes the number of maneuvers remaining in the route and terminates the reduction process if the number of maneuvers has become equal to or less than N.

If the number of maneuvers still exceeds N, the process continues. At stage S311, the navigation application removes highway split maneuvers where the base freeway remains the same. For example, the maneuver "Bear Right to stay on I-75" would be removed at this stage. The navigation application then recomputes the number of maneuvers remaining in the route and terminates the reduction process if the number of maneuvers has become equal to or less than N. Otherwise, the process continues to stage S313.

At stage S313, the navigation application removes highway interchanges beyond the first X maneuvers where there is a shared freeway number. For example, the maneuver, while on I80/I90, of "Bear Left to go onto I90" would be removed at this stage. The navigation application then recomputes the number of maneuvers remaining in the route and terminates the reduction process if the number of maneuvers has become equal to or less than N. Otherwise, the process continues to stage S315.

At stage S315, the navigation application compresses all remaining maneuvers beyond the first X maneuvers. For example, all maneuvers beyond the first X maneuvers may be replaced with a visual (map) or textual summary of the remaining route, e.g., "There are 7 more maneuvers to reach your destination of 123 Pine Road." After completion of stage S315, the process flows to step S305 wherein the reduction process is terminated and the reduced route is presented to the user. The user may request another route summary at another point in time, and the process described above may be repeated at that time.

Figure 4B:
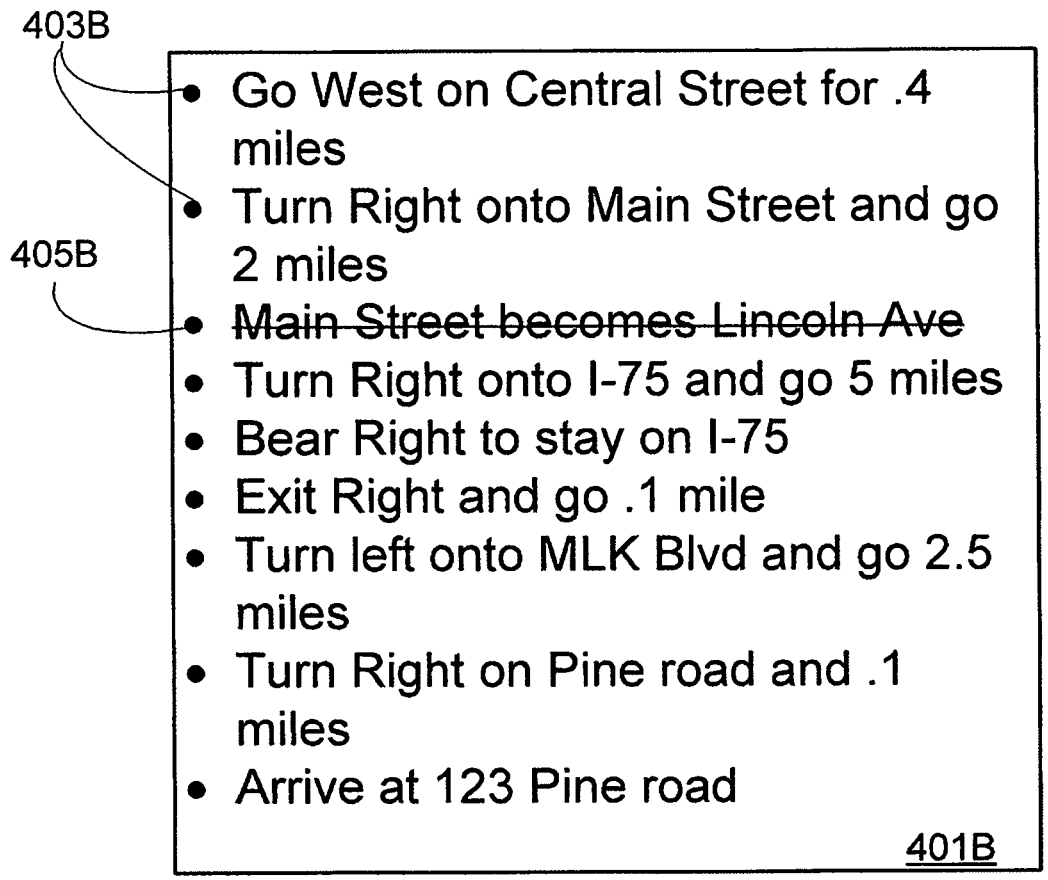
FIG. 4B is a reduced route listing wherein the route listing of FIG. 4A has been reduced according to an example of the invention.

The route listings of FIGS. 4A-D illustrate a textual route in various stages of reduction. FIG. 4A illustrates a route 401 to 123 Pine Road that contains 9 maneuvers. In this and the following examples, the maximum number N of maneuvers is set to 3. The number of instructions X exempted from reduction in this example is set to 2.

Figure 4C:
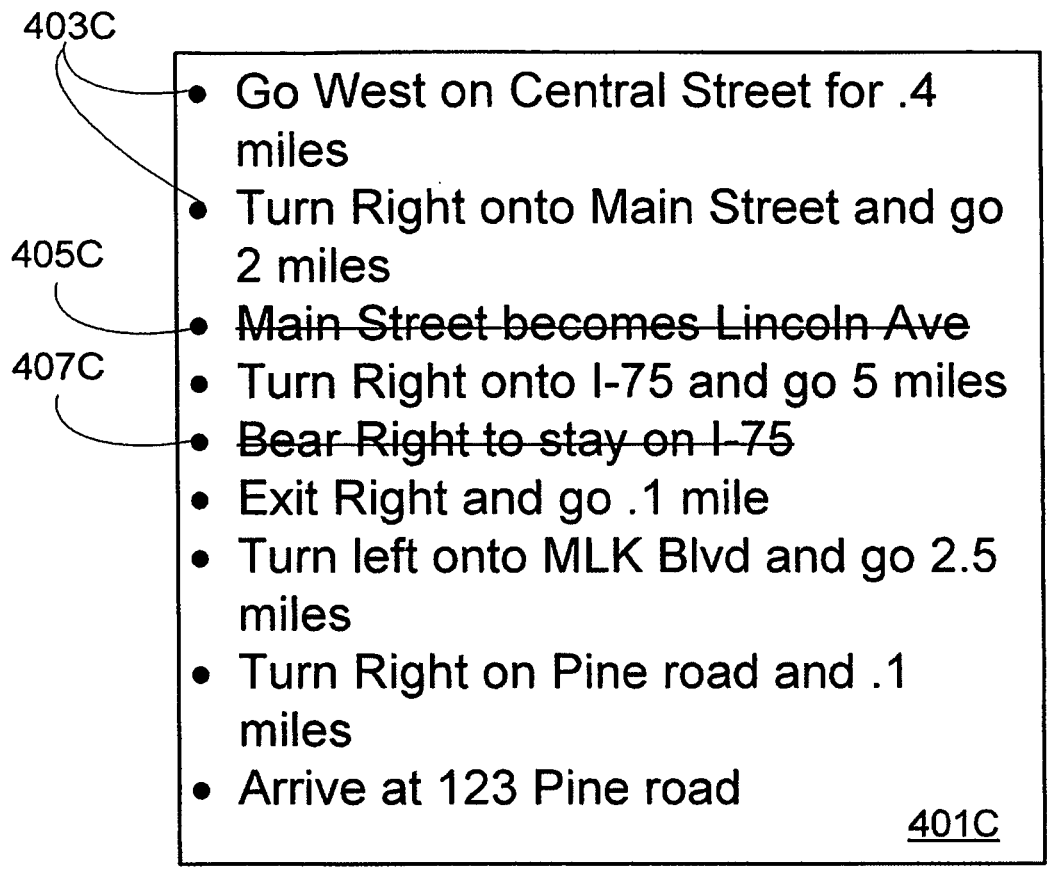
FIG. 4C is a reduced route listing wherein the route listing of FIG. 4B has been reduced according to an example of the invention.
Figure 4D:
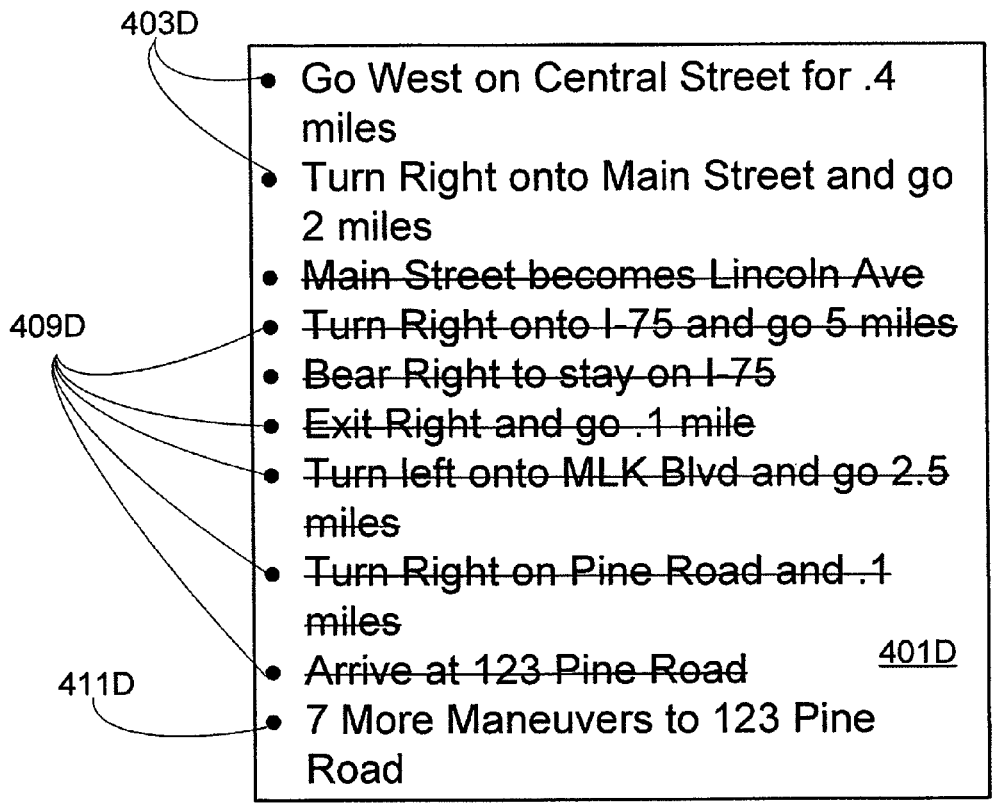
FIG. 4D is a reduced route listing wherein the route listing of FIG. 4C has been reduced according to an example of the invention.

Since the number of maneuvers in route 401 exceeds N, the navigation application undertakes route reduction, and the various stages of this reduction in this example are illustrated in FIGS. 4B-4D. There are no compound maneuvers in the route 401, and so that does not provide a source of reduction for this example route. In FIG. 4B, the navigation application has eliminated all street name change maneuvers (e.g., instruction 405B). This has reduced the total number of instructions to 8, which still exceeds N. Thus, further reduction is needed. The next category of reduction for which there are instructions in the illustrated route is highway split maneuvers where the base freeway remains the same. Thus, the maneuver "Bear Right to stay on I-75" 407C is eliminated in FIG. 4C.

At the point illustrated in FIG. 4C, there are still 7 instructions remaining, including 5 instructions 409D beyond the first 2. Thus, further reduction is needed, and the only remaining applicable reduction step is to compress all remaining maneuvers beyond the first 2 maneuvers. Thus, as shown in FIG. 4D, the navigation application compresses all steps beyond the first two into the characterization 411D "7 More Maneuvers to 123 Pine Road." At this point, the total number of instructions is equal to or less than N and the first X instructions have not been modified. Thus, the system has provided the user with sufficient information to accurately navigate in the near term, and has also provided a general preview of the route, that is easy to view and is not unnecessarily cluttered.

Although the route illustrated in FIGS. 4A-4D is shown in a textual format, it will be appreciated that the illustrated principles may be applied to other types of representation as well. For example, a graphical representation showing a plurality of maneuvers may be reduced and previewed in the same manner to reduce driver workload. A graphical representation may be, for example, a map, and/or a grouping of text and a graphical representation. In another example, verbal instructions uttering a plurality of maneuvers may be reduced and previewed.

It will be appreciated that the foregoing methods and implementations for route reduction are merely examples, and that these illustrate a preferred technique for route reduction. However, it is contemplated that other implementations of the invention may differ in detail from foregoing examples. As noted earlier, all references to the invention are intended to reference the particular example of the invention being discussed at that point and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of presenting a route of maneuvers in a vehicle to a user comprising:
   calculating a set of driving maneuvers usable to proceed from a first location that is a present location of the vehicle to a second location selected by the user;
   calculating the number of maneuvers in the set of driving maneuvers;
   determining whether the number of maneuvers in the set of driving maneuvers exceeds a predetermined maximum acceptable number of driving maneuvers;
   presenting the set of driving maneuvers if the number of maneuvers in the set of driving maneuvers does not exceed the predetermined maximum acceptable number of driving maneuvers; and
   if the number of maneuvers in the set of driving maneuvers exceeds the predetermined maximum acceptable number of driving maneuvers, reducing the set of driving maneuvers to create a preview set including the first location and the second location as well as a subset of driving maneuvers between the first location and the second location, wherein reducing the set of driving maneuvers to create a preview set comprises leaving a first portion of consecutive instructions of the set starting at the first location unreduced while reducing a second portion of the set, and presenting the preview set to the user via a navigational display.

2. The method according to claim 1, wherein reducing the second portion of the set comprises:
   accessing a reduction set of maneuver classes, wherein the reduction set comprises a sequential listing of maneuver classes having a first class of maneuvers followed by a sequential listing of one or more other classes of maneuvers;
   (a) removing all maneuvers of the first class from the second portion of the set of driving maneuvers to create a reduced set;
   (b) determining the number of maneuvers remaining in the reduced set;
   (c) presenting the reduced set via the navigational display if the number of maneuvers remaining in the reduced set does not exceed the predetermined maximum acceptable number of driving maneuvers; and
   sequentially repeating steps (a), (b), and (c) for each of the one or more other classes of maneuver until the number of maneuvers remaining in the reduced set does not exceed the predetermined maximum acceptable number of driving maneuvers.

3. The method according to claim 2, wherein a last maneuver class in the sequential listing of maneuver classes applies to every maneuver in the second portion of the set of driving instructions.

4. The method according to claim 2, wherein step (c) comprises presenting a statement summarizing two or more maneuvers that have been removed.

5. The method according to claim 1, wherein the first portion comprises a predetermined number of maneuvers.

6. The method according to claim 1, wherein presenting the set of driving maneuvers and presenting the preview set comprise presenting a user-understandable representation selected from the group consisting of a graphical representation, a textual representation, and a verbal representation.

7. A computer-readable medium having thereon computer-executable instructions for performing a method of presenting a route of maneuvers to a user of a vehicle, the computer-readable medium comprising:
   computer-executable instructions for calculating a set of driving maneuvers usable to proceed from a first location to a second location, wherein the first location is a current location of the vehicle and the second location is selected by the user;
   computer-executable instructions for calculating the number of maneuvers in the set of driving maneuvers;
   computer-executable instructions for determining whether the number of maneuvers in the set of driving maneuvers exceeds a predetermined maximum acceptable number of driving maneuvers;
   computer-executable instructions for presenting the set of driving maneuvers to the user if the number of maneuvers in the set of driving maneuvers does not exceed the predetermined maximum acceptable number of driving maneuvers; and
   computer-executable instructions for reducing the set of driving maneuvers to create a preview set including the first location and the second location and a subset of driving maneuvers between the first location and the second location if the number of maneuvers in the set of driving maneuvers exceeds the predetermined maximum acceptable number of driving maneuvers, wherein reducing the set of driving maneuvers to create a preview set includes leaving a first portion of consecutive instructions of the set starting at the first location unreduced while reducing a second portion of the set, and presenting the preview set to the user.

8. The computer-readable medium according to claim 7, wherein reducing the second portion of the set comprises:
   accessing a reduction set of maneuver classes, wherein the reduction set comprises a sequential listing of maneuver classes having a first class of maneuvers followed by a sequential listing of one or more other classes of maneuvers;
   (a) removing all maneuvers of the first class from the second portion of the set of driving maneuvers to create a reduced set;
   (b) determining the number of maneuvers remaining in the reduced set;
   (c) presenting the reduced set if the number of maneuvers remaining in the reduced set does not exceed the predetermined maximum acceptable number of driving maneuvers; and
   sequentially repeating steps (a), (b), and (c) for each of the one or more other classes of maneuver until the number of maneuvers remaining in the reduced set does not exceed the predetermined maximum acceptable number of driving maneuvers.

9. The computer-readable medium according to claim 8, wherein a last maneuver class in the sequential listing of maneuver classes applies to every maneuver in the second portion of the set of driving maneuvers.

10. The computer-readable medium according to claim 8, wherein step (c) comprises presenting a statement summarizing two or more maneuvers that have been removed.

11. The computer-readable medium according to claim 7, wherein the first portion comprises a predetermined number of maneuvers.

12. The method according to claim 7, wherein presenting the set of driving maneuvers and presenting the preview set comprise presenting a user-readable representation selected from the group consisting of a graphical representation, a textual representation, and a verbal representation.

13. A method of guiding a user by presenting a preview of a driving route starting at a first location and ending at a second location, wherein the first location is a current vehicle location and the second location is selected by the user, the driving route comprising a plurality of driving instructions, the preview comprising no more than a predetermined number of driving instructions, the method comprising:
    determining that the driving route comprises more than the predetermined number of driving instructions;
    eliminating a sufficient number of instructions from the driving route to create a route preview which includes the first location and the second location and only a subset of driving maneuvers between the first location and the second location, wherein eliminating a sufficient number of instructions from the driving route includes leaving a first portion of consecutive instructions of the set starting at the first location unreduced while reducing a second portion of the set and wherein the number of instructions in the route preview does not exceed the predetermined number of driving instructions; and
    presenting the route preview to the user.

14. The method according to claim 13, wherein the step of eliminating a sufficient number of instructions comprises sequentially eliminating one or more selected classes of driving instructions from the driving route, except for instructions within a predetermined first portion of the driving route, until the number of instructions in the driving route does not exceed the predetermined number of driving instructions.

15. The method according to claim 14, wherein one or more of the selected classes is selected from the group consisting of compound maneuvers, name change maneuvers, highway split maneuvers where the base freeway remains the same, highway interchanges where there is a shared freeway number, and all maneuvers in the route other than those within the predetermined first portion.

16. The method according to claim 13, wherein presenting the route preview to the user further comprised presenting to the user a summary of at least a portion of the eliminated instructions.

* * * * *